United States Patent
Brilmaker

(10) Patent No.: US 6,485,537 B2
(45) Date of Patent: Nov. 26, 2002

(54) STEAM SEPARATOR AND VALVE WITH DOWNWARD INLET

(75) Inventor: Stephane Brilmaker, Tilff (BE)

(73) Assignee: Armstrong International Incorporated, Stuart, FL (US)

( * ) Notice: Subject to any disclaimer, the term of this patent is extended or adjusted under 35 U.S.C. 154(b) by 1 day.

(21) Appl. No.: 09/818,217

(22) Filed: Mar. 27, 2001

(65) Prior Publication Data

US 2002/0139096 A1 Oct. 3, 2002

(51) Int. Cl.[7] .................................. B01D 45/08
(52) U.S. Cl. ................ 55/463; 55/418; 55/449; 239/132; 261/DIG. 76
(58) Field of Search ............... 55/462, 463, 464, 55/465, 466, 449, 319, 418; 239/132; 261/DIG. 76

(56) References Cited

U.S. PATENT DOCUMENTS

| | | | | |
|---|---|---|---|---|
| 532,296 A | * | 1/1895 | Sweet | 55/463 |
| 679,678 A | * | 7/1901 | King | 55/463 |
| 776,518 A | * | 11/1904 | Greenaway | 55/463 |
| 796,429 A | * | 8/1905 | Huxley | 55/413 |
| 890,537 A | * | 6/1908 | Stanley | 55/463 |
| 1,315,931 A | * | 9/1919 | Poppink | 261/DIG. 76 |
| 3,386,659 A | * | 6/1968 | Rea | 239/132 |
| 3,724,180 A | * | 4/1973 | Morton et al. | 239/132 |
| 3,857,514 A | * | 12/1974 | Clifton | 239/132 |
| 3,923,483 A | | 12/1975 | Hilmer et al. | |
| 5,395,569 A | * | 3/1995 | Badertscher et al. | 261/DIG. 76 |
| 5,516,466 A | * | 5/1996 | Schlesch et al. | 261/DIG. 76 |
| 5,942,163 A | | 8/1999 | Robinson et al. | |
| 6,065,740 A | * | 5/2000 | Morton | 261/DIG. 76 |

OTHER PUBLICATIONS

Armstrong International, Bulletin No. 504–H, 30M, May 1994, pp. 13, 14, 15, 16, 17, 21, 23, and 24.

* cited by examiner

Primary Examiner—David A. Simmons
Assistant Examiner—Minh-Chan T. Pham
(74) Attorney, Agent, or Firm—MacMillan, Sobanski & Todd, LLC

(57) ABSTRACT

A steam humidification apparatus includes a dispersion tube having a jacket defining a jacket area. The steam humidification apparatus includes a steam line for supplying steam to the jacket. The steam humidification apparatus includes a valve having a seat, the valve being positioned to deliver dry steam to the dispersion tube. The steam humidification apparatus includes a separator in communication with the valve, the separator being mounted to receive steam and to deliver dry steam to the valve. The separator, the valve, and the dispersion tube are all positioned generally coaxial.

17 Claims, 4 Drawing Sheets

STEAM SEPARATOR AND VALVE WITH DOWNWARD INLET

TECHNICAL FIELD

This invention relates to steam humidification systems for supplying steam into heating and air conditioning systems or for other industrial uses of steam. More particularly, this invention pertains to steam humidification systems useful in situations where it is undesirable for any of the steam introduced into an airstream to condense onto any surface, but rather it is required that the steam be quickly assimilated into a passing air flow by vaporization of any gas-borne condensate.

BACKGROUND OF THE INVENTION

Steam humidification systems are commonly used to raise the humidity level in air flow ducts. Typical untreated air in the winter months has very low absolute humidity, and it is desirable to increase the level of humidity in commercial and industrial facilities. This is particularly true for health care facilities such as hospitals and nursing homes. High relative humidity is also needed in industrial locations where static electricity is especially undesirable, such as in facilities housing electronic equipment, and in other industrial locations, such as fabric or paper handling, where a material must be prevented from drying out.

Steam humidification systems typically use dispersion tubes that are supplied with and dispense steam. Usually the dispersion tubes are positioned within air handling systems such as heating, ventilating and air conditioning ("HVAC") ducts to discharge steam into the air flowing through the ducts. The dispersion tubes may contain nozzles with which to dispense the steam. Since the steam is warmer than the air flowing through the HVAC ducts, the air flow in the ducts has a cooling effect on the dispersion tubes, and as the steam enters the dispersion tubes, some of the steam is cooled to the extent that it condenses into water. This is to be avoided because the gas-borne condensate, or water, can be discharged along with the steam. The result is water in the HVAC duct and other equipment, thereby providing an environment ripe for the growth of undesirable microorganisms.

Another known system for the humidification of a flow of air is the use of an array or bank of unjacketed dispersion tubes that are enhanced with various features to prevent condensed water from being discharged from the discharge orifices along with the steam. In such a system, the discharge orifices may have tiny tubes that extend into the dispersion tube to prevent condensed water from easily exiting the dispersion tube along with the flow of humidification steam.

Humidification systems frequently employ a valve to selectively control the flow of steam through the dispersion tubes. The valve is opened in response to the sensed humidity. Conventional valves generally do not have a mechanism built in to allow for drainage of liquid that can collect in the valve as the steam cools and condenses when the valve is closed. Conventional valves are thus subject to undesirable water collection. The valves can also cool during periods of decreased steam demand, as less steam passes through the valve to warm the valve. The valves typically have a large mass and may cool due to a heat transfer to its surrounding environment, thereby causing condensation of steam. It would thus be desirable to provide a smaller valve and a humidification system that provides for less cooling of the valve and water collection in the valve.

SUMMARY OF THE INVENTION

The above objects as well as other objects not specifically enumerated are achieved by a steam humidification apparatus having a dispersion tube having a jacket defining a jacket area. The steam humidification apparatus includes a steam line for supplying steam to the jacket. The steam humidification apparatus includes a valve having a seat, the valve being positioned to deliver dry steam to the dispersion tube. The steam humidification apparatus includes a separator in communication with the valve, the separator being mounted to receive steam and to deliver dry steam to the valve. The separator, the valve, and the dispersion tube are all positioned generally coaxial.

According to this invention, there is provided a steam humidification apparatus including a valve body having a lower surface, a seat, and a steam inlet. The steam inlet is positioned on the lower surface to receive steam through the lower surface of the valve body. The steam humidification apparatus includes a separator in communication with the steam inlet of the valve body. The separator is positioned to receive steam and to deliver dry steam to the steam inlet in the lower surface of the valve body. The steam humidification apparatus includes a plug movably disposed and adapted to be moved into and out of sealing engagement with the seat, and an operator operatively connected to the plug.

BRIEF DESCRIPTION OF THE DRAWINGS

FIG. 5 is a schematic view, similar to that shown in FIG. 1, of another embodiment of the invention, showing the separator turned 90 degrees.

DETAILED DESCRIPTION AND PREFERRED EMBODIMENTS OF THE INVENTION

Figure 1:
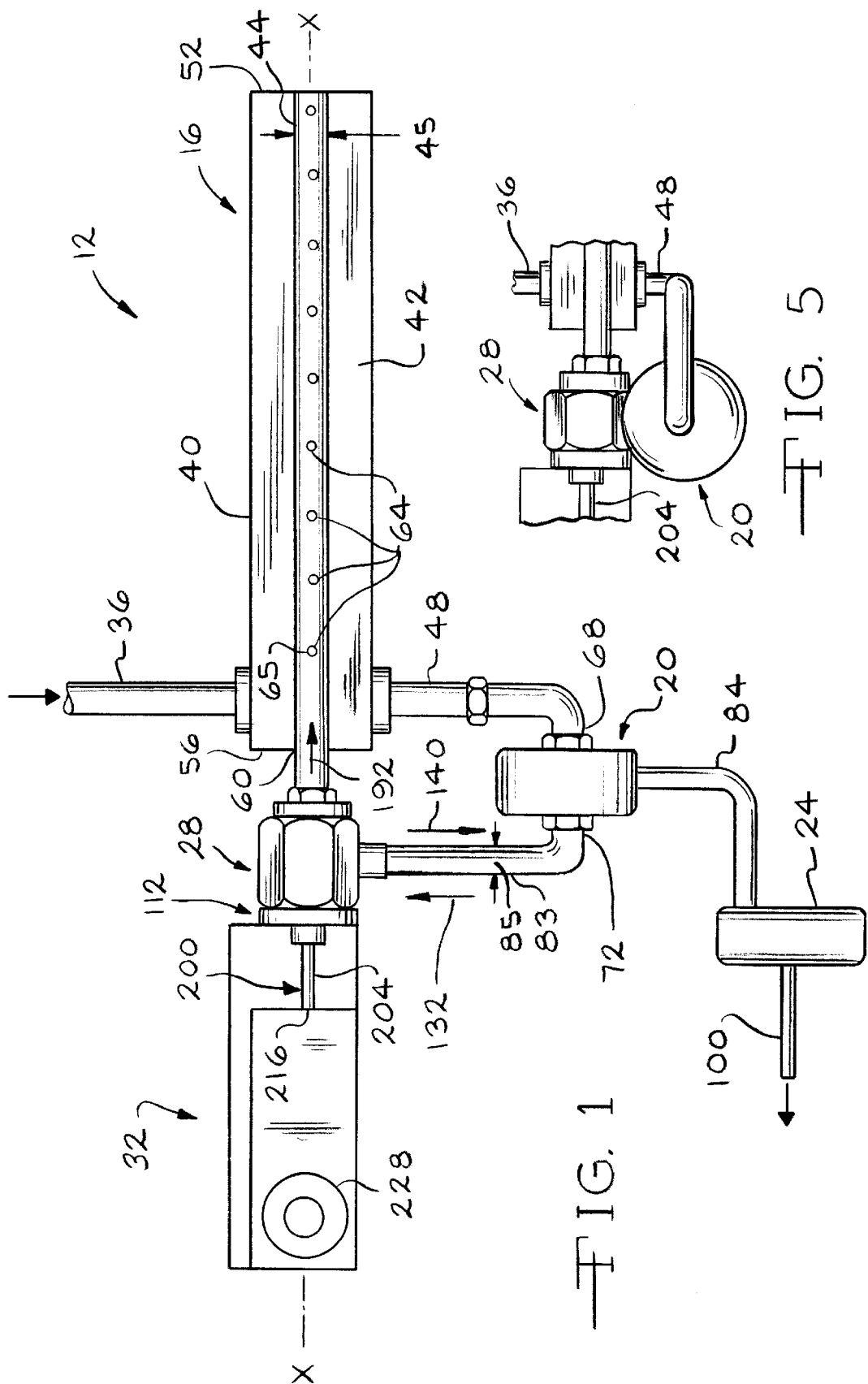
FIG. 1 is a schematic view in elevation of a jacketed steam humidification apparatus according to the invention.
Figure 2:
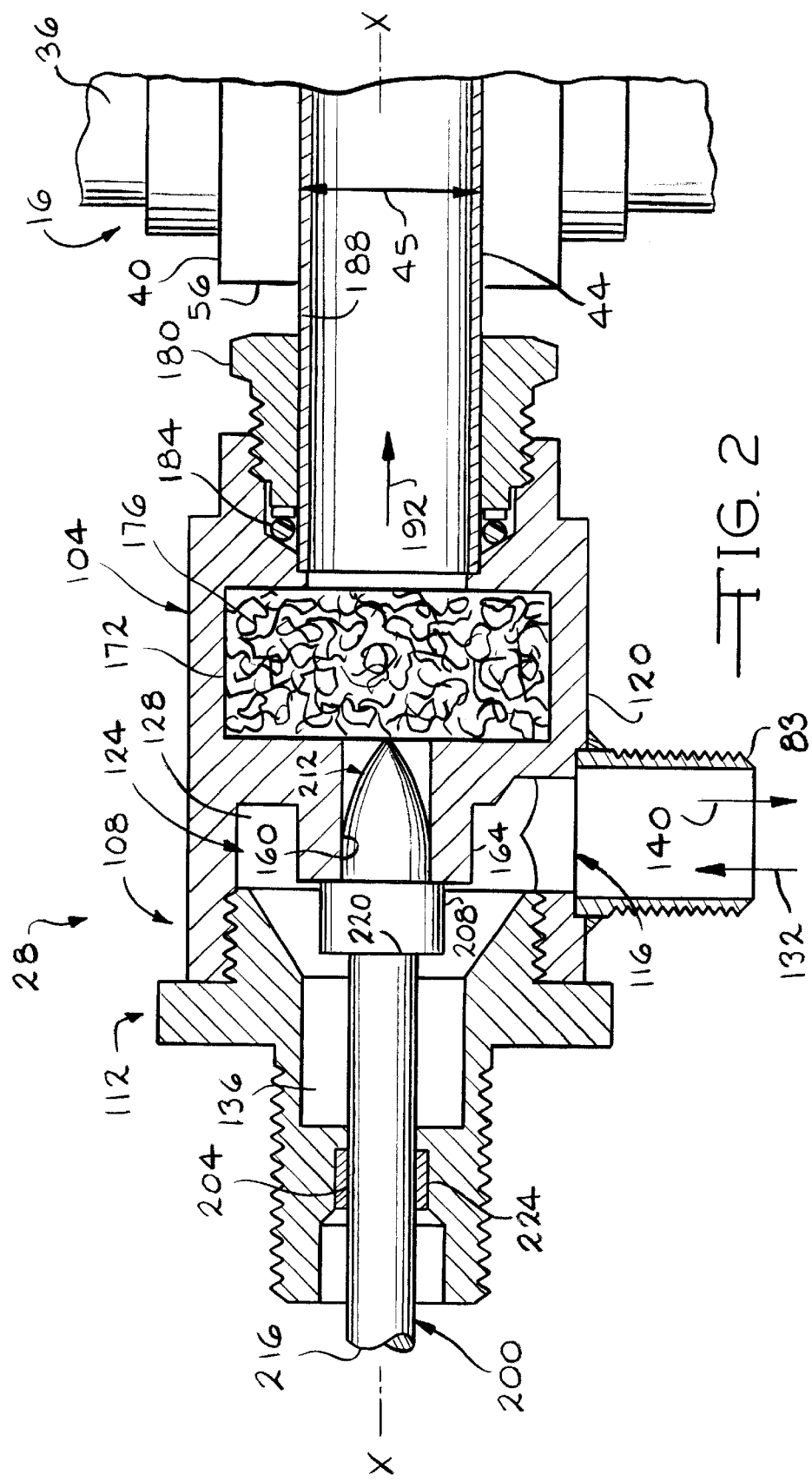
FIG. 2 is a cross-sectional view in elevation of a valve that can be used in the steam humidification apparatus of FIG. 1.

As shown in FIGS. 1 and 2, the steam humidification apparatus of the invention is indicated generally at 12. Although this invention will be described and illustrated in conjunction with the particular steam humidification apparatus disclosed herein, it will be appreciated that this invention may be used in conjunction with other steam humidification apparatuses. The general structure and operation of portions of the steam humidification apparatus is conventional in the art. Thus, only those portions of the steam humidification apparatus which are necessary for a full understanding of this invention will be explained and illustrated in detail. The steam humidification apparatus 12 preferably includes a jacketed manifold 16 that is operative to distribute steam to a desired location, a separator 20 that is operative to separate steam from liquid, a steam trap 24 that is operative to eliminate the liquid from the separator 20, a valve 28 operative to regulate a flow of steam into the jacketed manifold 16, and an operator 32 that is operative to selectively open and close the valve 28. The steam humidification apparatus 12 is positioned along a generally longitudinal axis "X." The axis "X" is preferably oriented generally horizontally as illustrated.

The jacketed manifold 16 includes a jacket 40 and a dispersion tube 44. The jacketed manifold 16 is thus a jacketed dispersion tube. The jacket 40 and the dispersion tube 44 are preferably positioned generally coaxial with each other and are positioned along the longitudinal axis "X." The term "generally coaxial" is understood to include configurations of the steam humidification apparatus wherein two or more components of the steam humidification apparatus are serially aligned with each other, with only minor changes in axial orientation between the components. It will be appreciated that the jacketed manifold 16 is preferably positioned generally horizontally as illustrated.

The jacket 40 defines a jacket area 42 around the dispersion tube 44. The jacket area 42 is a chamber. The jacket 40 may be a pipe, conduit, or insulated passageway. The jacket 40 is positioned to provide steam around the dispersion tube 44, thereby warming the dispersion tube 44. The jacket area 42 is thus a relatively controlled temperature environment for the dispersion tube 44, thereby preferably minimizing condensation of the steam in the dispersion tube 44.

The jacket 40 receives steam from a steam line 36. The dispersion tube 44 can be any suitable manifold or chamber or pipe with openings in its perimeter. The steam line 36 is preferably a generally downwardly (in FIG. 1) extending conduit that is in communication with the jacket 40. The jacket 40 may have any suitable crosssectional shape. In the illustrated steam humidification apparatus 12, the steam in the jacket 40 is delivered to the separator 20 by a pipe 48. The pipe 48 is a generally downwardly (in FIG. 1) extending conduit that is in communication with the jacket 40. The jacket 40 preferably includes a first end 52 and a second end 56. The first end 52 is preferably a flat generally round plate. The second end 56 is preferably a flat generally round plate with a hole 60 positioned approximately in the center of it. The dispersion tube 44 extends through the hole 60 in the second end 56 of the jacket 40. In operation, the steam enters the jacket area 42 from the steam line 36. The steam then travels to the first end 52, around a baffle (not shown), and back toward the second end 56. The steam then exits through the pipe 48.

The dispersion tube 44 includes a major cross-sectional dimension 45. The major cross-sectional dimension 45 is understood to be the largest chord that can be drawn on a cross-section of the dispersion tube 44. When the dispersion tube 44 has a round cross-sectional shape, the major cross-sectional dimension 45 is a diameter of the dispersion tube 44. When the dispersion tube 44 and the jacket 40 have round cross-sections, the dispersion tube 44 has a diameter that is less than the diameter of the jacket 40.

The dispersion tube 44 preferably has a number of nozzles 64 that disperse steam out from the jacketed manifold 16. The nozzles 64 are dispersion points for the steam. The nozzles 64 may include tiplets. The steam dispersion tube 44 includes a nearest dispersion point 65. The term "nearest dispersion point" in this context is understood to include that steam dispersion tube 44 nearest to the valve 28. The illustrated dispersion tube 44 includes nine nozzles 64, although it may include any suitable number of the nozzles 64. The nozzles 64 are preferably pipes having a generally round cross-section. The nozzles 64 preferably extend through the perimeter of the dispersion tube 44 and penetrate the jacket 40. The steam from the dispersion tube 44 is delivered through the nozzles 64 to the desired location, such as for example an air duct (not shown).

Figure 4:
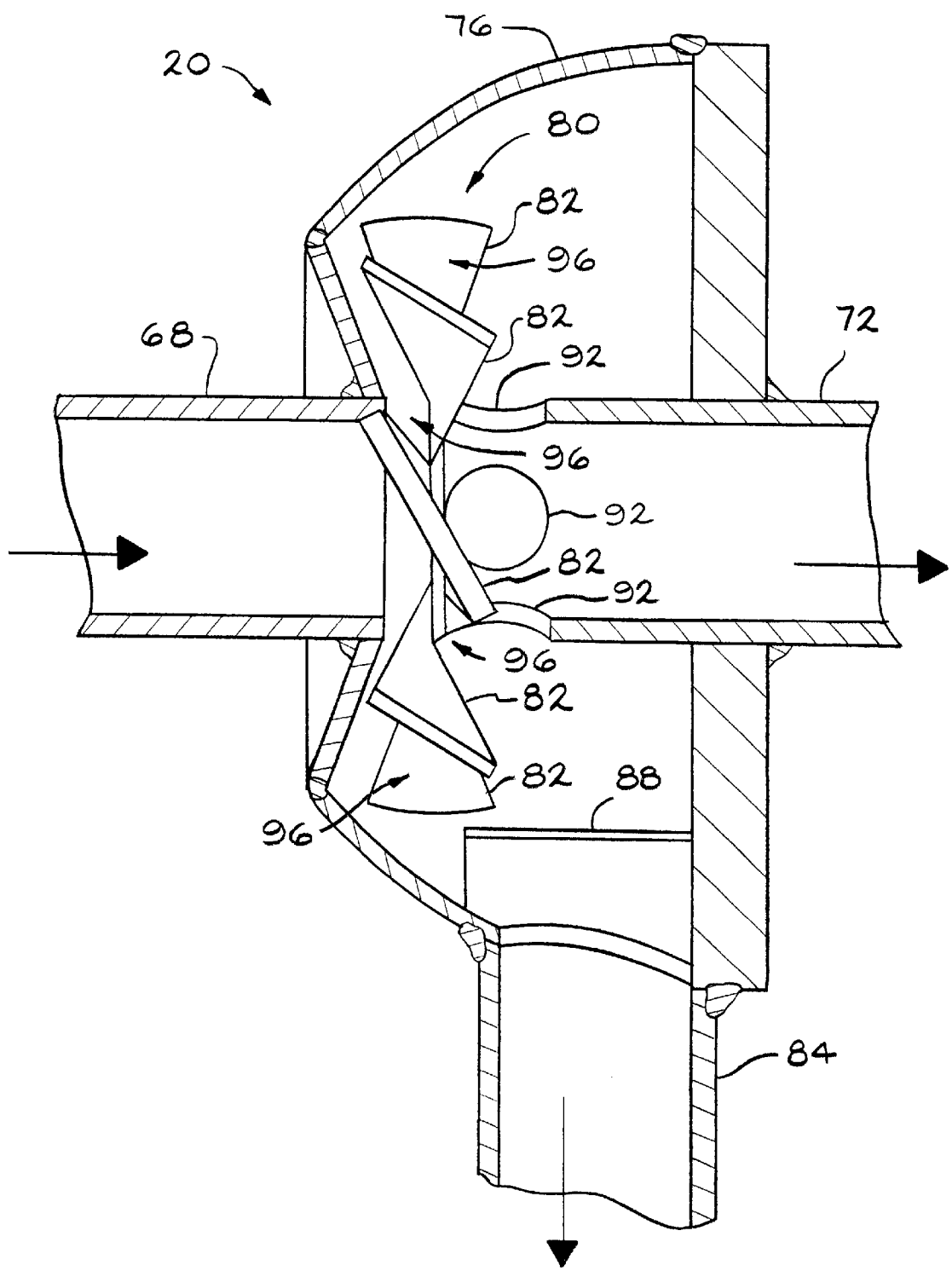
FIG. 4 is a preferred embodiment of the separator for use with the steam humidification apparatus according to the invention.

Referring now to FIG. 4, a preferred embodiment of the separator 20 is illustrated. Other separators may be employed. The separator 20 receives the steam from the jacket 40 of the jacketed manifold 16. The separator 20 preferably includes a steam inlet conduit 68 and a steam outlet conduit 72 fixed to a body 76, an impeller 80 positioned in the body 76, and a drain 84 to remove the liquid. Because the steam may become cooler compared to its temperature in the steam line 36, and thus become a mixture of the steam and a liquid (i.e. wet steam), the separator 20 may receive both the steam and the liquid from the pipe 48.

The separator 20 is mounted to receive wet steam, and to deliver dry steam to the valve 28. The dry steam preferably contains substantially no liquid. As a mixture of the steam and the liquid pass through the steam inlet conduit 68, the steam and the liquid impinge on the impeller 80. The liquid generally moves radially outwardly and contacts the body 76. The impeller 80 also preferably includes blades 82 positioned to direct the liquid into the body 76. The body 76 is a liquid receiving surface. The liquid then exits the separator 20 through the drain 84. In a preferred embodiment, a deflector 88 is positioned proximate the drain 84. The deflector 88 is operative to facilitate liquid removal, as it serves to deflect the liquid toward the drain 84. It will be appreciated that the separator 20 is preferably positioned generally horizontally as illustrated.

The steam also moves radially outwardly toward the body 76 after contacting the impeller 80. In contrast to the liquid, substantially all the steam is received into gas exhaust ports 92 provided in the steam outlet conduit 72. The term "substantially all" in this context means a percentage of greater than about 80 percent. Before moving into the gas exhaust ports 92, the steam preferably passes through gas escape openings 96 between the blades 82 of the impeller 80. The gas exhaust ports 92 are downstream of the steam inlet conduit 68 and the impeller 80. The gas exhaust port 92 may be placed at any suitable location on the steam outlet conduit 72, although it is desirably placed immediately downstream of the impeller 80.

Referring back to FIG. 1, the steam trap 24 is positioned to receive the liquid from the separator 20 through the drain 84. The steam trap 24 may be any suitable steam trap and is conventional in the art. The liquid from the separator 20 may be accompanied by some of the steam from the separator 20. The steam from the drain 84 is trapped by the steam trap 24. The liquid flows through a recovery pipe 100 for further processing.

The valve 28 (seen best in FIG. 2) is positioned to receive the steam from the separator 20. It will be appreciated that the valve 28 is preferably positioned generally horizontally as shown. The valve 28 includes a valve body 104 having an operator side 108 connected to a bonnet 112. The valve body 104 and the bonnet 112 are preferably threaded to engage each other, as shown. The valve body 104 and the bonnet 112 may be connected together by any suitable mechanical or chemical means operative to position the valve body 104 and the bonnet 112 relatively stationary with respect to each other. Non limiting examples of suitable connecting means include adhesive, fasteners, or welds.

A conduit 83 is positioned to provide for communication between the separator 20 and the valve body 104. The illustrated conduit 83 is an elbow-type conduit, although it may be any suitable shaped conduit. The conduit 83 is in communication with the steam outlet conduit 72 of the separator 20. The conduit 83 includes a major cross-sectional dimension 85. The major cross-sectional dimension 85 is understood to be the largest chord that can be drawn on a cross-section of the conduit 83. When the conduit 83 has a round cross-sectional shape, the major cross-sectional dimension 85 is a diameter of the conduit 83. In a preferred embodiment of the steam humidification apparatus 12, the distance between the separator 20 and the valve body 104 is less than about three times the major cross-sectional dimension 85 of the conduit 83.

The valve body 104 also includes a steam inlet 116 being positioned to receive steam in a lower surface 120 of the valve body 104. As shown in FIG. 2, the steam inlet 166 includes a downwardly facing opening to receive steam. Specifically, the downwardly facing opening of the steam inlet 116 is positioned to receive the steam from the conduit 83, which supplies dry steam from the steam outlet conduit 72 of the separator 20. The valve body 104 and the bonnet 112 cooperate to define a warming chamber 124 between them. The warming chamber 124 is positioned to warm the valve body 104 with the steam entering the steam inlet 116 as indicated by the arrow 132. The warming chamber 124 is a temperature control chamber. The warming chamber 124 preferably includes a seat warming portion 128 and an operator portion 136. The seat warming portion 128 and the operator portion 136 are in communication. The seat warming portion 128 is preferably generally annular. It will be appreciated that as the steam in the warming chamber 124 cools some condensation will occur. When the valve 28 is closed or severely restricted, the flow of the steam through the valve 28 decreases or stops completely. Without a steady flow of steam, the warming chamber 124 cools, and the steam in the warming chamber 124 also cools. Because the steam inlet 116 is on the bottom surface 120 of the valve body 104, the condensed liquid will flow back into the separator 20, as indicated by the arrow 140. The warming chamber 124 and the valve 28 are therefore substantially self-draining.

The valve body 104 also preferably includes a seat 160 in an extended shoulder 164 of the valve body 104. The seat 160 preferably has a generally round cross-sectional shape, although it may have any suitable shape. The seat 160 is preferably positioned generally coaxial to the jacketed manifold 16. The extended shoulder 164 is preferably a generally ring shaped portion of the valve body 104 with the seat 160 being positioned approximately in the center of the extended shoulder 164. The extended shoulder 164 of the valve body 104 extends into the seat warming portion 128 of the warming chamber 124. In a preferred embodiment, the extended shoulder 164 is positioned above (in FIG. 2) the steam inlet 116, thus allowing for warming of the extended shoulder 164 by the steam. When the extended shoulder 164 is warmed by the steam, the valve body 104 is also warmed. It is desirable to warm the valve body 104 to prevent cooling and possible liquid collection in it, and to maintain the steam in the valve body 104 in a relatively dry condition. In a preferred embodiment, the distance between the seat 160 and the dispersion tube 45 is less than about three times the major cross-sectional dimension 45 of the dispersion tube 44. In a preferred embodiment of the steam humidification apparatus 12, the distance between the separator 20 and the seat 160 is less than about three times the major cross-sectional dimension 85 of the conduit 83. In a preferred embodiment of the steam humidification apparatus 12, the distance between the seat 160 and the dispersion tube 44 is less than about three times the major cross-sectional dimension 45 of the dispersion tube 44.

The valve body 104 desirably contains an optional silencing chamber 172. The silencing chamber 172 is positioned downstream of the seat 160 and upstream of the dispersion tube 44 of the jacketed manifold 16. The silencing chamber 172 is provided with a silencing medium 176. The silencing medium 176 is operative to substantially reduce and preferably eliminate noise from the steam travelling through the seat 160 to the dispersion tube 44. The silencing medium 176 is preferably positioned downstream from the seat 160. The silencing medium 176 may be any substance suitable for absorbing sound, such as for example steel wool. It will be appreciated that the steam moves through the valve 28 and into the dispersion tube 44 as indicated by the arrow 192 when the valve 28 is open.

The valve body 104 is preferably fitted to the dispersion tube 44 of the jacketed manifold 16 by a fitting 180. The fitting 180 is preferably a threaded nut. A seal 184 may be positioned between the fitting 180 and the valve body 104. The seal 184 is operative to reduce and preferably eliminate escape of the steam between the valve body 104 and the fitting 180. It will be appreciated that an exposed portion 188 of the jacketed manifold 16 may exist, particularly between the fitting 180 and the dispersion tube 44. The exposed portion 188 is preferably is as small as practical, and represents and area where the steam in the dispersion tube 44 can cool. In a preferred embodiment, the jacket 40 of the dispersion tube 44 contacts the valve 28.

The steam humidification apparatus 12 preferably includes a plug assembly 200. The plug assembly 200 is preferably positioned generally along the longitudinal axis "X." In a preferred embodiment, the plug assembly 200 includes a stem 204 fixed to a collar 208 and operatively connected to a plug 212. The stem 204 is preferably a generally cylindrical rod having an operator end 216 and a valve end 220. The operator end 216 of the stem 204 is operatively connected to the operator 32. The valve end 220 of the stem 204 is operatively connected to the plug 212. A bearing 224 is preferably provided to support movement of the plug assembly 200 along the longitudinal axis "X."

The plug 212 selectively engages the seat 160 to selectively allow the steam in the warming chamber 124 to flow through the valve body 104. In FIG. 2, the plug 212 is illustrated as being in engagement with the seat 160 and thereby preventing the steam from flowing through the valve body 104 into the dispersion tube 44 of the jacketed manifold 16. In FIG. 2, the plug 212 is mounted for generally horizontal movement, preferably along the longitudinal axis "X" as illustrated. In a preferred embodiment, the The operator 32 preferably includes a moving means, indicated generally at 228. The operator 32 is operatively connected to the plug 212 by the moving means 228. The moving means 228 is positioned and operable to selectively move the plug 212 into and out of sealing engagement with the seat 160 of the valve body 104. The moving means 228 may be any suitable electrical or mechanical device. One non limiting example of a suitable moving means 228 is an actuator using a suitable motor.

Figure 3:
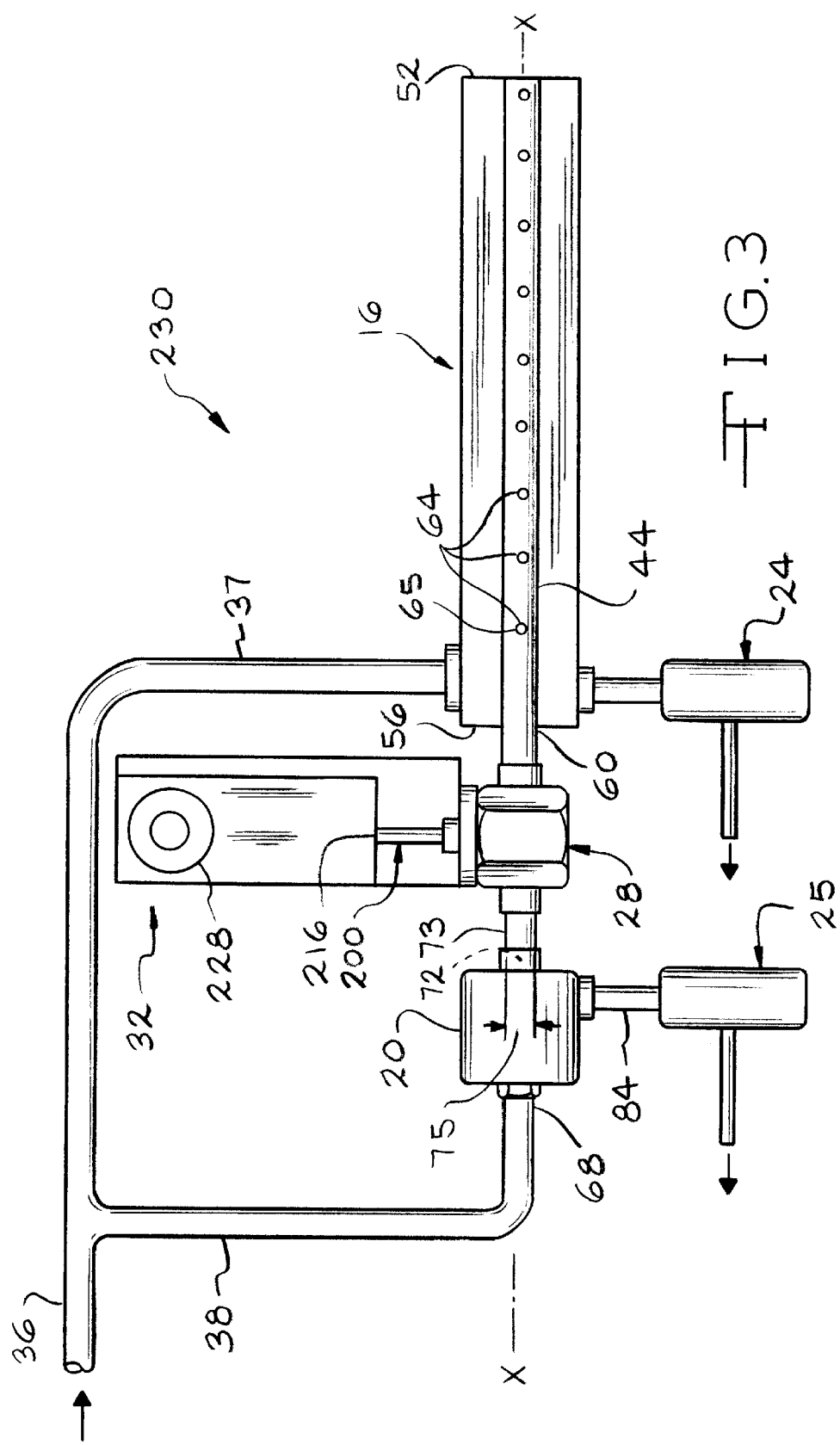
FIG. 3 is an alternate embodiment of the jacketed steam humidification apparatus according to the invention.

Referring now to FIG. 3, an alternate embodiment of the steam humidification apparatus 230 is illustrated. The steam humidification apparatus 230 preferably includes a jacketed manifold 16 that is operative to distribute steam to a desired location, a separator 20 that is operative to separate steam from liquid, a first steam trap 25 that is operative to collect the liquid from the separator 20, a second steam trap 24 that is operative to collect the liquid from the jacketed manifold 16, a valve 28 operative to regulate a flow of steam into the jacketed manifold 16, and an operator 32 that is positioned and operable to selectively open and close the valve the valve 28. The steam humidification apparatus 230 is provided along a generally longitudinal axis "X." Similarly numbered or named portions of the steam humidification apparatus 230 of FIG. 3 have structures and functions similar to those portions of the steam humidification apparatus 12 of FIG. 1.

The steam line 36 bifurcates to supply steam to a warming steam line 37 and a humidification steam line 38. The warming steam line 37 and the humidification steam line 38 may be independent steam lines and need not be fed from the steam line 36. The warming steam line 37 is operative to supply steam to the jacket 40 of the jacketed manifold 16. The humidification steam line 38 is operative to supply steam to the separator 20. The steam humidification apparatus 230 also preferably includes a first steam trap 25 and a second steam trap 24. The alternate embodiment of the steam humidification apparatus 230 includes a plug 212 operatively connected to the operator 32. The plug 212 is mounted for generally vertical movement. It will be noted that separator 20, the valve 28, and the manifold 44 are all positioned generally coaxial, or in-line with each other. It should be noted that, in contrast to the steam humidification apparatus 12 of FIG. 1, the valve 28 and the operator 32 in the steam humidification apparatus 230 of FIG. 3 are positioned generally vertically as shown. Therefore, the plug (not shown in FIG. 3) of the valve 28 is positioned for generally vertical movement.

A conduit 73 is positioned to provide for communication between the separator 20 and the valve 28. The conduit 73 is in communication with the steam outlet conduit 72 of the separator 20. The conduit 73 includes a major cross-sectional dimension 75. The major cross-sectional dimension 75 is understood to be the largest chord that can be drawn on a cross-section of the conduit 73. When the conduit 73 has a round cross-sectional shape, the major cross-sectional dimension 75 is a diameter of the conduit 73. In a preferred embodiment, of the steam humidification apparatus 230, the distance between the separator 20 and the valve 28 is less than about three times the major cross-sectional dimension 75 of the conduit 73.

FIG. 5 shows another embodiment of the invention. The separator 20 is rotated about 90 degrees compared to the position of the separator 20 shown in FIG. 1. The separator 20 may be rotated any suitable number of degrees to allow the separator 20 to fit more compactly in the steam humidification apparatus 12. Rotation of the separator 20 may be desirable to provide a more compact steam humidification apparatus 12.

The principle and mode of operation of this invention have been described in its preferred embodiment. However, it should be noted that this invention may be practiced otherwise than as specifically illustrated and described without departing from its scope.

What is claimed is:

1. A steam humidification apparatus comprising:
   a dispersion tube having a major cross-sectional dimension, and a jacket defining a jacket area;
   a steam line for supplying steam to the jacket;
   a valve having a seat, the valve being positioned to deliver dry steam to the dispersion tube; and
   a separator in communication with the valve, the separator being mounted to receive steam and to deliver dry steam to the valve;
   wherein the distance between the seat and the dispersion tube is less than about three times the major cross-sectional dimension of the dispersion tube.

2. The steam humidification apparatus of claim 1 further comprising a conduit in communication between the separator and the valve, the conduit having a major cross-sectional dimension wherein the distance between the separator and the valve is less than about three times the major cross-sectional dimension of the conduit.

3. The steam humidification apparatus of claim 1 wherein the jacket of the dispersion tube contacts the valve.

4. The steam humidification apparatus of claim 1 wherein the valve is positioned generally horizontally.

5. The steam humidification apparatus of claim 1 wherein the seat is positioned generally coaxial to the dispersion tube.

6. A steam humidification apparatus comprising:
   a valve body having a lower surface, a seat, and a steam inlet, the steam inlet having a downwardly facing opening to receive steam;
   a separator in communication with the steam inlet of the valve body, the separator being positioned to receive steam and to deliver dry steam to downwardly facing opening of the steam inlet of the valve body;
   a plug movably disposed and adapted to be moved into and out of sealing engagement with the seat; and
   an operator operatively connected to the plug.

7. The steam humidification apparatus of claim 6 further comprising a dispersion tube having a jacket, wherein the jacket of the dispersion tube contacts the valve body.

8. The steam humidification apparatus of claim 6 further comprising a conduit in communication between the separator and the seat, the conduit having a major cross-sectional dimension wherein the distance between the separator and the seat is less than about three times the major cross-sectional dimension of the conduit.

9. The steam humidification apparatus of claim 6 further comprising a dispersion tube having a major cross-sectional dimension wherein the distance between the seat and the dispersion tube is less than about three times the major cross-sectional dimension of the dispersion tube.

10. The steam humidification apparatus of claim 6 wherein the plug is mounted for generally horizontal movement.

11. The steam humidification apparatus of claim 6 wherein the plug is mounted for generally vertical movement.

12. The steam humidification apparatus of claim 6 in combination with a dispersion tube.

13. The steam humidification apparatus of claim 12 wherein the dispersion tube and the valve opening are positioned generally coaxial.

14. The steam humidification apparatus of claim 6 further comprising a bonnet wherein the valve body and the bonnet cooperate to define a warming chamber.

15. The steam humidification apparatus of claim 14 wherein the seat includes an extended shoulder extending into the warming chamber.

16. The steam humidification apparatus of claim 6 further comprising a silencing medium positioned downstream of the seat.

17. A steam humidification apparatus comprising:
   a dispersion tube having a jacket defining a jacket area;
   a steam line for supplying steam to the jacket;
   a valve having a seat, the valve being positioned to deliver dry steam to the dispersion tube;
   a separator in communication with the valve, the separator being mounted to receive steam and to deliver dry steam to the valve; and
   a conduit in communication between the separator and the valve, the conduit having a major cross-sectional dimension wherein the distance between the separator and the valve is less than about three times the major cross-sectional dimension of the conduit;
   wherein the separator, the valve, and the dispersion tube are all positioned generally coaxially.

* * * * *